US008028286B2

(12) United States Patent
Fedorova (10) Patent No.: US 8,028,286 B2
(45) Date of Patent: Sep. 27, 2011

(54) METHODS AND APPARATUS FOR SCHEDULING THREADS ON MULTICORE PROCESSORS UNDER FAIR DISTRIBUTION OF CACHE AND OTHER SHARED RESOURCES OF THE PROCESSORS

(75) Inventor: Alexandra Fedorova, Lincoln, MA (US)

(73) Assignee: Oracle America, Inc., Redwood City, CA (US)

( * ) Notice: Subject to any disclaimer, the term of this patent is extended or adjusted under 35 U.S.C. 154(b) by 1323 days.

(21) Appl. No.: 11/606,751

(22) Filed: Nov. 30, 2006

(65) Prior Publication Data

US 2008/0134185 A1  Jun. 5, 2008

(51) Int. Cl.
    *G06F 9/46* (2006.01)
(52) U.S. Cl. .................. 718/102; 718/104; 718/107
(58) Field of Classification Search .......... 718/102, 718/104, 106
    See application file for complete search history.

(56) References Cited

U.S. PATENT DOCUMENTS

| | | | | |
|---|---|---|---|---|
| 6,549,930 B1 * | 4/2003 | Chrysos et al. | ............... | 718/104 |
| 7,353,517 B2 * | 4/2008 | Accapadi et al. | ............ | 718/102 |
| 7,360,218 B2 * | 4/2008 | Accapadi et al. | ............ | 718/102 |
| 7,707,578 B1 * | 4/2010 | Zedlewski et al. | ............ | 718/102 |
| 7,788,670 B2 * | 8/2010 | Bodas et al. | ................... | 718/105 |
| 2005/0021655 A1 * | 1/2005 | Liu et al. | ........................ | 709/213 |
| 2005/0028160 A1 * | 2/2005 | Cofer et al. | .................... | 718/100 |

OTHER PUBLICATIONS

A. Fedorova, M. Seltzer, and M. D. Smith, "Cache-Fair Thread Scheduling for Multicore Processors," Technical Report TR-17-06, Division of Engineering and Applied Sciences, Harvard University, Oct. 2006.*
R. E. Matick, T. J. Heller, and M. Ignatowski, "Analytical analysis of finite cache penalty and cycles per instruction of a multiprocessor memory hierarchy using miss rates and queuing theory," IBM Journal Of Research and Development, vol. 45 No. 6, Nov. 2001.*
Office Action for U.S. Appl. No. 11/606,736 dated May 13, 2009.
Notice of Allowance for U.S. Appl. No. 11/606,736 dated Dec. 15, 2009.

* cited by examiner

*Primary Examiner* — Meng An
*Assistant Examiner* — Louis Diep
(74) *Attorney, Agent, or Firm* — Brooks Kushman P.C.

(57) ABSTRACT

A thread scheduler identifies a thread operable to be scheduled by a scheduling policy for execution on the chip multiprocessor. The thread scheduler estimates, for the thread, a performance value that is based on runtime statistics of the thread for a shared resource on the chip multiprocessor. Additionally, the thread scheduler applies the performance value to the scheduling policy in order to reallocate processor time of the thread commensurate with the performance value under fair distribution of the shared resource on the chip multiprocessor. The thread scheduler also applies the performance value to the scheduling policy in order to reallocate processor time of at least one co-executing thread to compensate for the reallocation of processor time to the thread.

16 Claims, 7 Drawing Sheets

FIG. 1a

PRIOR ART

FIG. 7

METHODS AND APPARATUS FOR SCHEDULING THREADS ON MULTICORE PROCESSORS UNDER FAIR DISTRIBUTION OF CACHE AND OTHER SHARED RESOURCES OF THE PROCESSORS

BACKGROUND

Multi-core processors ("chip multiprocessors") contain multiple processing cores that enable multiple application threads to run simultaneously on a single processor device. Such multi-core technology provides improved power efficiency and increased hardware utilization in comparison with conventional single-core processors. Furthermore, during execution, each processing core of the chip multiprocessor shares various resources that are not specifically dedicated to a single processing core. These shared resources include, for example, level 2 (L2) on-board cache devices, memory bus devices, direct memory access (DMA) devices, store buffers and the like. Typically, as in conventional multiprocessor systems, a computer's operating system manages and administers the application threads via a scheduling policy. The scheduling policy, in turn, determines when and for how long the particular application threads will execute on the various processing cores of the chip multiprocessor.

SUMMARY

Conventional scheduling policies were designed and implemented for conventional multiprocessors and, thus, suffer from a variety of deficiencies. To that effect, conventional scheduling policies make assumptions that do not apply on chip multiprocessors. For example, such conventional scheduling policies assume that the central processing unit (CPU), or multiprocessor, is a single, indivisible resource. Conventional scheduling policies further assume that if application threads are granted equal time slices (e.g., execution time on a processing core of the multiprocessor), those threads will share the CPU equally. On chip multiprocessors, however, concurrently running threads, or co-runners, often share a single second-level (L2) cache, whereby cache allocation is controlled by the hardware. Cache sharing depends solely on the cache needs of the co-runner(s), and unfair cache sharing often occurs. A thread's cache occupancy affects its cache miss rate, and, as a result, impacts the rate at which the thread retires instructions. Therefore, a thread's CPU performance significantly varies depending on the characteristics of its co-runner (also referred to as a thread's "co-runner dependent performance variability").

Co-runner dependent performance variability can create a number of problems. One such problem is unfair CPU sharing among co-executing threads. Conventional schedulers ensure that equal-priority threads get equal time shares of the CPU execution. With multiprocessors, a thread's share of the CPU, and thus its forward progress, depends both upon its CPU quantum and the cache behavior of its co-runners. For example, a thread may perform its instructions up to 36% slower with an incompatible co-runner. Another problem attributed to co-runner dependent performance variability is poor priority enforcement. A priority-based scheduler on a conventional processor ensures that elevating a job's (e.g., thread's) priority results in greater forward progress for that job. With a multiprocessor, if the high-priority job is scheduled with 'bad', or incompatible, co-runners, that particular thread will experience inferior performance. Yet another problem caused by co-runner dependent performance variability is inaccurate CPU accounting. On commercial computing systems where users are charged for CPU hours, conventional schedulers ensure that processes are billed proportionally to the amount of computation accomplished by a job. With a chip multiprocessor, however, the amount of computation performed in a CPU hour varies depending on the co-runners. Thus, charging a user for CPU hours on a chip multiprocessor is not necessarily an accurate and proportionate accounting metric.

Accordingly, example configurations described herein substantially overcome the shortcomings presented by providing a cache-fair scheduling policy that significantly improves thread performance efficiency on chip multiprocessors. The cache-fair scheduling policy reduces the effects of unequal CPU cache sharing that occur on chip multiprocessors such as unfair CPU sharing, priority inversion, and inadequate CPU accounting. To achieve fair sharing of CPU resources on conventional multiprocessors, the operating system should consider L2 cache allocation. This problem is similar to fair sharing in a shared-memory multiprocessor, but the solution in the context of chip multiprocessors is quite different. The difference is that the operating system can control multiprocessor memory allocation, while L2 cache allocation is outside the operating system's control. The cache-fair algorithm redistributes CPU time to threads to account for unequal cache sharing. Thus, if a thread's performance decreases due to unequal cache sharing, that particular thread will be allocated more CPU execution time, and vice versa (that is, if a thread's performance increases due to unequal cache sharing, that particular thread will be allocated less CPU execution time). In implementing the cache-fair algorithm, the operating system should determine how a thread's performance is affected by unequal cache sharing using limited information from the hardware. To accomplish this, the cache-fair algorithm uses runtime statistics and analytical models and, as a result, does not require new hardware structures or operating system control over cache allocation.

In accordance with embodiments disclosed herein, a thread scheduler measures performance statistics of a thread at runtime to obtain the actual performance value for that thread. The thread scheduler also estimates a performance value for a particular thread if the thread were shared equally with other threads on the chip multiprocessor. Typically, this estimated performance value is the fair performance value. As such, the thread scheduler allocates processor time to the thread based on the comparison of the thread's actual performance value and fair performance value.

More specifically, in one example embodiment disclosed herein, the thread scheduler identifies a thread operable to be scheduled by a scheduling policy for execution on the chip multiprocessor. The thread scheduling process estimates, for the thread, a performance value that is based on runtime statistics of the thread for a shared resource on the chip multiprocessor. Additionally, the thread scheduling process applies the performance value to the scheduling policy in order to allocate processor time of the thread commensurate with the performance value. In this manner, the allocation of processor time estimates an equal share of the shared resource among co-executing threads on the chip multiprocessor. The thread scheduling process also applies the performance value to the scheduling policy in order to reallocate processor time of at least one co-executing thread to compensate for the allocation of processor time to the thread. In one example embodiment, the thread scheduling process repeats the steps of, i) applying the performance value to the scheduling policy in order to allocate processor time of the thread commensurate with the performance value, and ii) applying the performance value to the scheduling policy in order to reallocate processor time of at least one co-executing thread to compensate for the allocation of processor time to the thread, at a predetermined frequency defined by the scheduling policy.

In another embodiment, the thread scheduler identifies the thread as a member of a time critical thread group, wherein members of the time critical thread group are subject to an increase in the reallocation of processor time to compensate for the reallocation of processor time of another co-executing thread. For example, in one embodiment at least one time critical thread has its processor quanta adjusted to compensate for unequal cache sharing (e.g., the processor quanta will be either decreased or increased). As a result of these adjustments, the threads in the time critical group will run as quickly as if the cache were shared equally, attaining their fair performance value. In addition, the thread scheduler may also identify the thread as a member of a best effort thread group, wherein members of the best effort thread group are subject to a decrease in the reallocation of processor time to compensate for the reallocation of processor time of another co-executing thread. In accordance with an example embodiment, the thread scheduler performs adjustments in CPU quanta allocations to at least one thread in the best effort group, where these adjustments are necessary and proportional to the CPU quanta adjustments for threads in the time critical group. It should be noted that, during reallocation of CPU quanta, the threads in the best-effort group will not necessarily attain their fair performance value. Furthermore, the thread scheduler reallocates processor time to at least one thread in the time critical group in accordance with a reallocation distribution algorithm. The thread scheduler also reallocates processor time to at least one thread in the best effort thread group in accordance with the reallocation distribution algorithm. In one example configuration, the thread scheduling process implements the reallocation distribution algorithm to distribute processing time equally among each thread in at least one of the group comprising the time critical thread group, and the best effort thread group.

In yet another embodiment, the thread scheduler determines a fair L2 cache miss rate based on the number of L2 cache misses per processing cycle that the thread would experience under equal L2 cache sharing on the chip multiprocessor. Moreover, the thread scheduler determines a fair cycles per instruction (CPI) rate (e.g., the fair performance value) based on the number of processing cycles per instruction achieved by a thread under equal L2 cache sharing on the chip multiprocessor. The thread scheduler also estimates a fair number of instructions value based on the number of instructions the thread would have executed under the existing scheduling policy using the fair CPI rate. Additionally, the thread scheduler determines the actual number of instructions completed by the thread for a predetermined time (e.g., the actual performance value). As a result, the thread scheduler determines an amount of processing cycles for the scheduling policy to adjust for the thread based on the relationship between the fair performance value and the actual performance value. In its operation, the thread scheduler may determine an amount of processing cycles for the scheduling policy to decrease when allocating processor time for the thread. The thread scheduler may additionally determine an amount of processing cycles for the scheduling policy to increase when allocating processor time for the thread.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems Inc. of Palo Alto, Calif., USA.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In accordance with embodiments disclosed herein, the cache-fair scheduling policy (e.g., thread scheduling process 150-2, herein referred to as the "thread scheduler 150-2") reduces co-runner-dependent performance variability by redistributing CPU time such that a thread runs as quickly as it would with an equally shared cache, regardless of its co-runners. More specifically, the thread scheduling policy 150-2 makes the thread's CPU latency (e.g., the time to complete a logical unit of work, such as 10 million instructions) equal to its CPU latency under equal cache sharing. A thread's CPU latency is the product of its cycles per instruction (CPI) (e.g., how efficiently the thread uses its allocated CPU cycles) and share of CPU time (how long the thread executes on the CPU). Co-runner-dependence affects a thread's CPI, because, for example, a cache-starved thread incurs more memory stalls and exhibits a higher CPI. An operating system scheduler, on the other hand, influences the thread's CPU latency by adjusting the thread's share of CPU time.

Figure 1A:
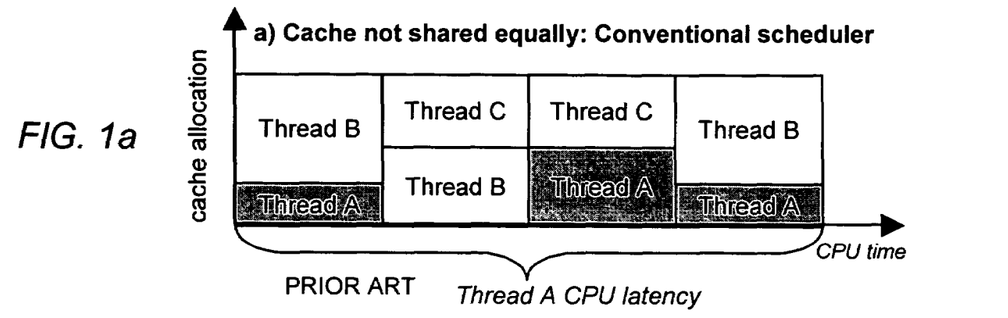
FIGS. 1a-1c are a series of charts showing co-executing threads in various caching configurations in accordance with one example embodiment.
Figure 1B:
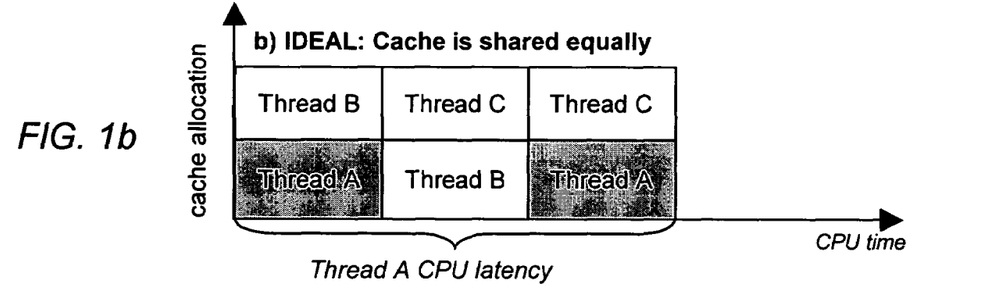
Figure 1C:
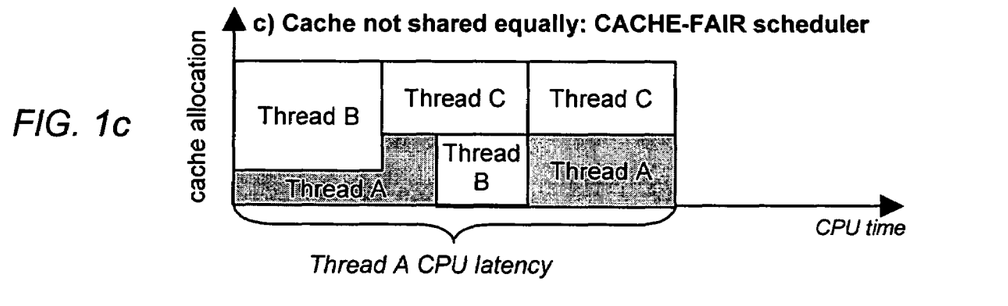

FIGS. 1a-1c illustrate three example co-runner dependencies of three threads (A though C) running on a dual-core processor. Assume for these examples that a box corresponds to each thread. The height of the box indicates the amount of cache allocated to a particular thread. Likewise, the width of the box indicates the CPU quantum (e.g., execution time on a processing core of a chip multiprocessor) allocated to the thread. The area of the box is proportional to the amount of work completed by the thread. Furthermore, thread boxes that are stacked on top of one another indicate co-runners (e.g., threads co-executing on multiple processing cores). As shown in FIG. 1a, if the cache is not shared equally, Thread A is cache-starved when it runs with Thread B and has better performance when it runs with Thread C.

FIG. 1b depicts an ideal scenario wherein the cache is shared equally, as indicated by the equal heights of all the boxes. Ideally, wherein the cache is not shared equally, a scheduling policy should complete the same amount of work (e.g., the collective area of the Thread A boxes) in the same time (the length along the X-axis) it takes in the ideal scenario. However, as shown in FIG. 1(a), Thread A completes less work per unit of time than in the caching scheme shown in FIG. 1(b) because it does not get an equal share of the cache when running with Thread B. As a result, Thread A takes longer to complete the same amount of work. In other words, Thread A's latency with unequal cache sharing is longer than its latency with equal cache sharing.

FIG. 1c shows how the cache-fair algorithm (e.g., thread scheduler 150-2) eliminates the dependency of Thread A's performance on Thread B. By giving Thread A more CPU cycles, Thread A retains the same latency as under equal cache sharing as depicted in the caching scheme of FIG. 1b. It should be noted that the adjustment to Thread A's CPU quantum in FIG. 1c is temporary. Once the thread catches up with its work, the thread's CPU quantum is restored to its initial value. Giving more CPU time to one thread takes time away from another thread (or other threads in general), and vice versa. As such, FIG. 1c illustrates that the cache-fair algorithm gives more time to Thread A at the expense of Thread B. Therefore, the cache-fair algorithm (e.g., thread scheduler 150-2) requires the establishment of two classes of threads in the system: the "time critical" class and the "best-effort" class. In the example shown in FIG. 1, Thread A is a time critical thread and Thread B is a best-effort thread. The thread scheduler 150-2 reduces co-runner-dependent performance variability for threads in the time critical class, but not for threads in the best-effort class.

Figure 2:
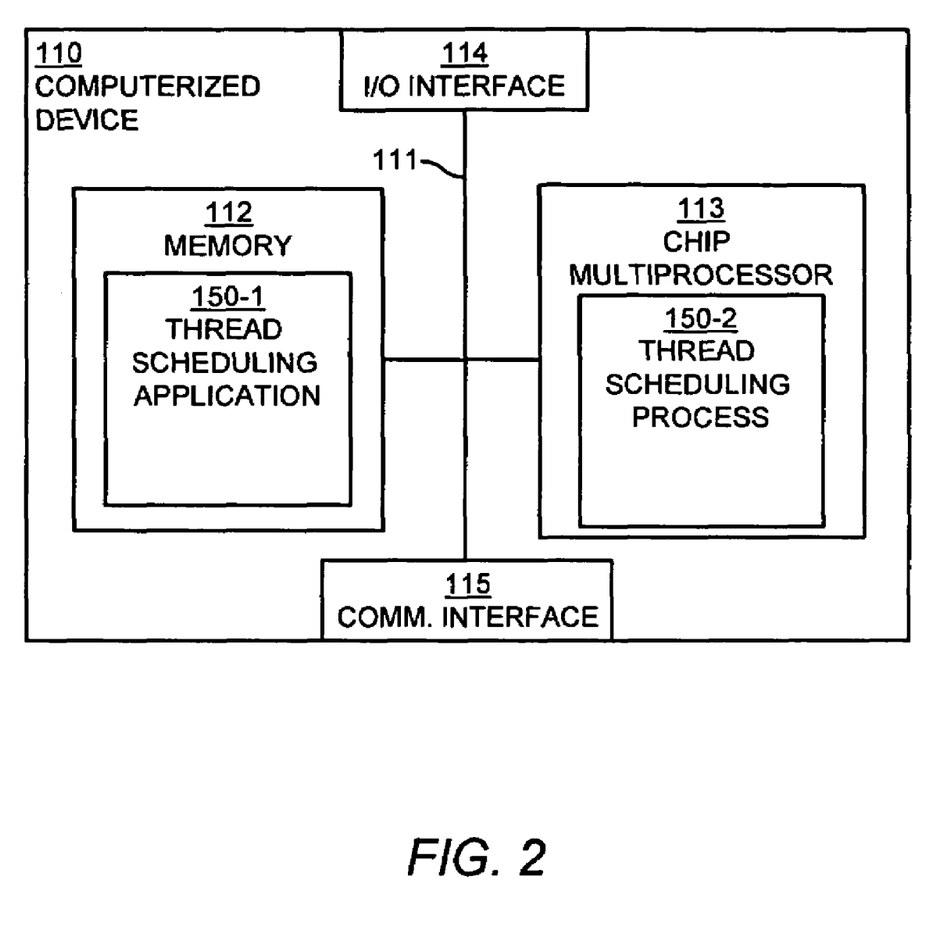
FIG. 2 is a block diagram of a computerized system configured with an application including a thread scheduler in accordance with one example configuration.

FIG. 2 is a block diagram illustrating example architecture of a computer system 110 that executes, runs, interprets, operates or otherwise performs a thread scheduling application 150-1 and process 150-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a chip multiprocessor 113 (e.g., having a plurality of processing cores), an input/output interface 114, and a communications interface 115. An input device 116 (e.g., one or more user/developer controlled devices such as a pointing device, keyboard, mouse, etc.) couples to chip multiprocessor 113 through I/O interface 114, and enables a user 108 to provide input commands and generally control the graphical user interface 171 that the computer system provides on the display 130. The communications interface 115 enables the computer system 110 to communicate with other devices (i.e., other computers) on a network (not shown). This can allow access to the thread scheduler application 150-1 by remote computer systems.

The memory system 112 is any type of computer readable medium and in this example is encoded with a thread scheduling application 150-1. The thread scheduling application 150-1 may be embodied as software code such as data and/or logic instructions (e.g., code stored in the memory or on another computer readable medium such as a removable disk) that supports processing functionality according to different embodiments described herein. During operation of the computer system 110, the chip multiprocessor 113 accesses the memory system 112 via the interconnect 111 in order to launch, run, execute, interpret or otherwise perform the logic instructions of the thread scheduling application 150-1. Execution of the operating system, in part, as the thread scheduling application 150-1 (e.g., on at least one processing core of the chip multiprocessor 113) in this manner produces processing functionality in a thread scheduler 150-2. In other words, the thread scheduler 150-2 represents one or more portions of runtime instances of the thread scheduling application 150-1 (or the entire application 150-1) performing or executing within or upon the chip multiprocessor 113 in the computerized device 110 at runtime.

Flow charts of the example embodiments presently disclosed methods are depicted in FIGS. 3, 5, 6 and 7. The rectangular elements are herein denoted "steps" and represent computer software instructions or groups of instructions. Alternatively, the steps are performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
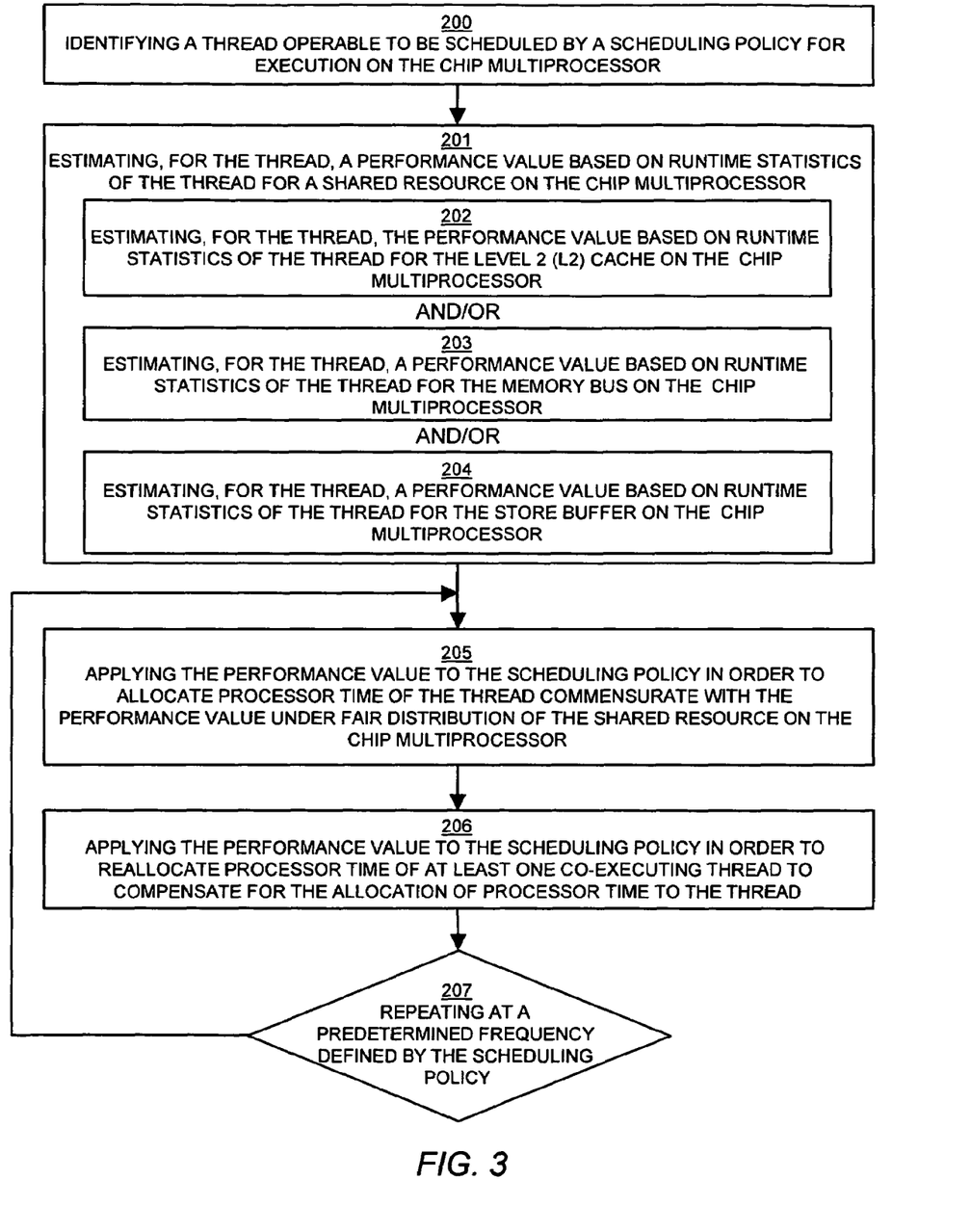
FIG. 3 is a flow chart of processing steps that shows high-level processing operations performed by the thread scheduler when it schedules cache-fair multiprocessing in accordance with one example embodiment.

FIG. 3 is a flow chart of processing steps that shows high-level processing operations performed by the thread scheduler 150-2 when it enforces a cache-fair scheduling policy in accordance with one example embodiment.

In step 200, the thread scheduler 150-2 identifies a thread operable to be scheduled by a scheduling policy for execution on the chip multiprocessor 113.

Figure 4:
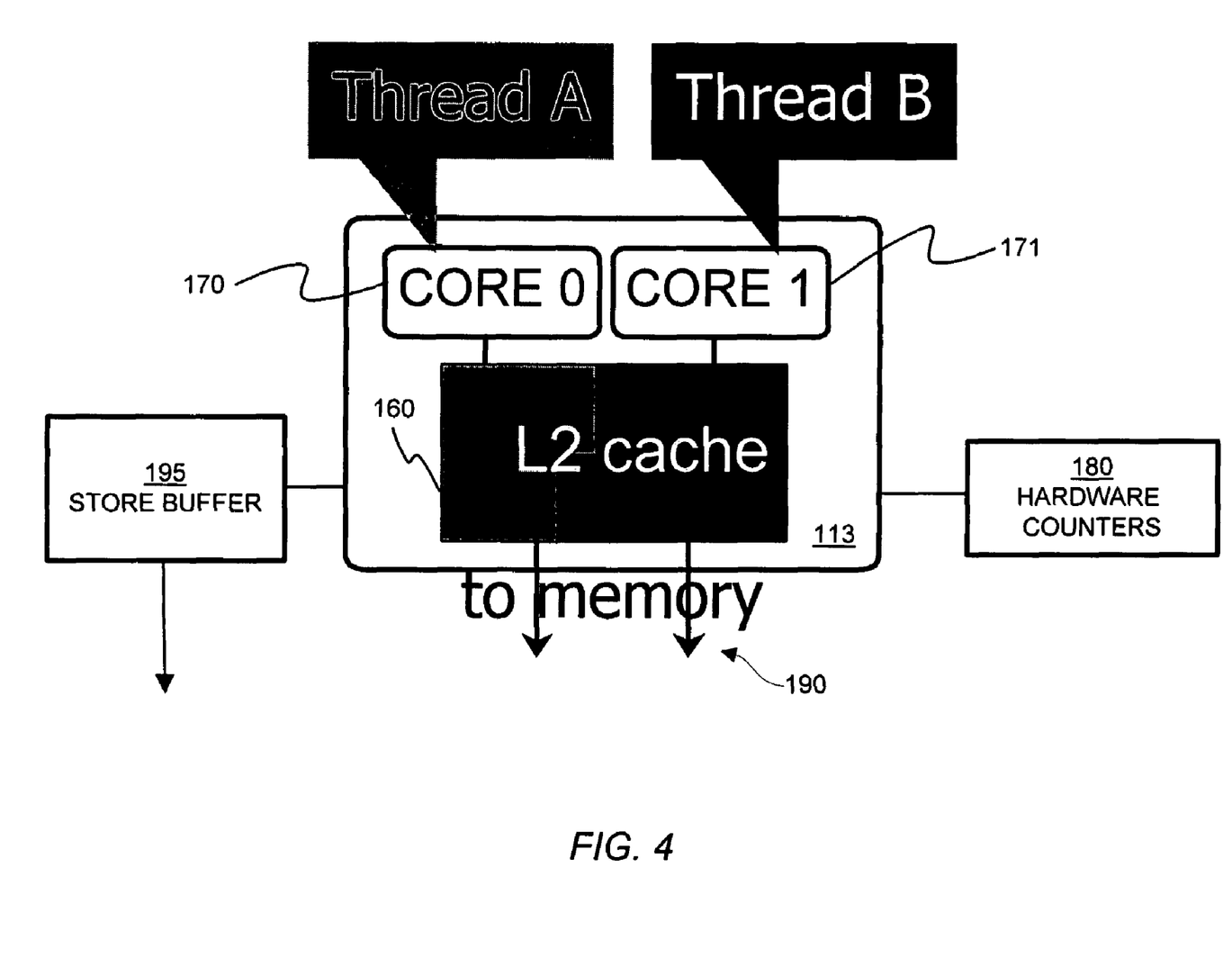
FIG. 4 is a block diagram of a dual-core chip multiprocessor system configured with various shared resources and implementing a thread scheduler in accordance with one example configuration.

FIG. 4 depicts an example configuration of a dual-core chip multiprocessor 113 having a first processing core (core-0) 170 and second processing core (core-1) 171. In this example, Thread A executes on first processing core (core-0) 170 and Thread B executes on second processing core (core-1) 171. Furthermore, processing cores 170 and 171 share L2 cache 160 located on chip multiprocessor 113. Assume for this example embodiment that the thread scheduler 150-2 identifies Thread A for cache-fair scheduling.

In step 201, the thread scheduler 150-2 estimates, for the thread, a performance value based on runtime statistics of the thread for a shared resource on the chip multiprocessor 113. In order to correctly estimate adjustments to the CPU quantum (e.g., computing the performance value), the thread scheduler 150-2 utilizes only limited information from hardware counters 180 on the chip multiprocessor 113. Hardware counters 180 dynamically measure the runtime statistics of threads, such as the number of cache misses and retired instructions, and, in the case of some dual-core processors, the number of cache lines allocated to each virtual processor. However, the hardware counters 180 do not indicate how thread performance is affected by unequal cache sharing. Instead, thread performance (e.g., the thread performance value) is determined by using information from both hardware counters 180 and analytical models.

In one example embodiment, the thread scheduler 150-2 estimates the performance value during a reconnaissance phase. During the reconnaissance phase, the thread scheduler 150-2 determines the performance value for the identified thread. For example, assume that Thread A has been identified by the thread scheduler 150-2 and is in the reconnaissance phase. As Thread A executes concurrently on the chip multiprocessor 113 with a group of co-runners (e.g., Threads B as depicted in FIG. 4), the thread scheduler 150-2 measures the statistics (e.g., via hardware counters 180) used to determine the performance value of Thread A. In this manner, Thread A is not forced to execute with specific co-runners. Thus, the thread scheduler 150-2 observes any co-runner combinations that appear on the chip multiprocessor 113. In one example embodiment, the identified thread (e.g., Thread A) executes at least 10 million instructions in each co-runner group.

In step 202, the thread scheduler 150-2 estimates, for the thread, the performance value based on runtime statistics of the thread for the L2 cache on the chip multiprocessor. In one example embodiment, the performance value is the fair L2 cache miss rate of the thread when based on runtime statistics for the L2 cache on the chip multiprocessor.

In step 203, the thread scheduler 150-2 estimates, for the thread, a performance value based on runtime statistics of the thread for the memory bus 190 on the chip multiprocessor 113. In one example embodiment, the thread scheduler 150-2 estimates a fair memory bus delay on the chip multiprocessor 113, wherein the fair memory bus delay is the memory bus delay corresponding to the fair L2 cache miss rate.

In step 204, the thread scheduler 150-2 estimates, for the thread, a performance value based on runtime statistics of the thread for store buffer 195 on the chip multiprocessor 113. In one example embodiment, the thread scheduler 150-2 estimates a fair store buffer delay value on the chip multiprocessor 113, wherein the fair store buffer delay is the store buffer delay corresponding to the fair L2 cache miss rate.

In step 205, the thread scheduler 150-2 applies the performance value (e.g., computed using the estimated fair L2 cache miss rate (step 202), the fair memory bus delay (step 203), and the fair store buffer delay (step 204)) to the scheduling policy in order to reallocate processor time of the thread commensurate with the performance value under fair distribution of the shared resource on the chip multiprocessor. In one example configuration, the thread scheduler 150-2 applies the performance value to the scheduling policy during a calibration phase. Typically, the thread scheduler 150-2 implements the calibration phase for the identified thread (e.g., Thread A) after completing the reconnaissance phase. During the calibration phase, the thread scheduler 150-2 continuously adjusts, or calibrates, the threads' CPU quantum (e.g., the execution time for Thread A, e.g., a time critical thread discussed further below, on processing core (core-0) 170 as shown in FIG. 4) to approximate the threads' fair performance value.

Figure 5:
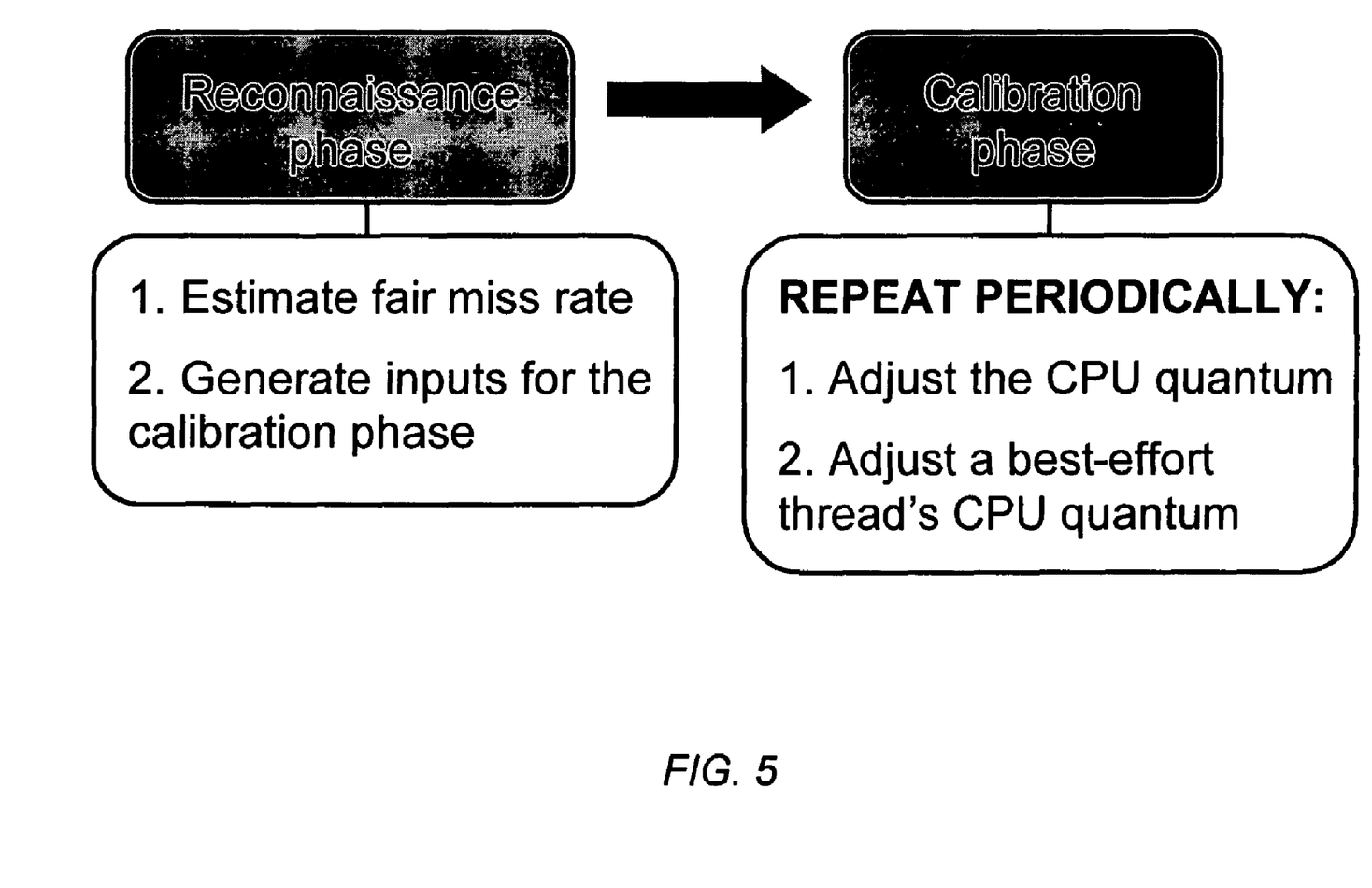
FIG. 5 is a diagram of processing steps that shows high-level processing operations performed by the thread scheduler during reconnaissance and calibration phases in accordance with one example configuration.

FIG. 5 is a diagram of processing steps that depicts the relationship between the thread scheduler's 150-2 implementation of the reconnaissance phase and the calibration phase. Details of reconnaissance and calibration phase processing are discussed further below.

In step 206, the thread scheduler 150-2 applies the performance value to the scheduling policy in order to reallocate processor time of at least one co-executing thread to compensate for the reallocation of processor time to the thread. In one example embodiment, the thread scheduler 150-2 applies the performance value to the scheduling policy to compensate for an unequal cache share allocated to the time critical thread. For example, if the thread scheduler 150-2 increases a time critical thread's CPU quantum, the thread scheduler 150-2 accordingly decreases a best-effort thread's CPU quantum by the same amount. Conversely, if the thread scheduler 150-2 decreases a best-effort thread's CPU quantum, the thread scheduler 150-2 accordingly increases a time-critical thread's CPU quantum by the same amount.

In step 207, the thread scheduler 150-2 repeats step 205 and 206 at a predetermined frequency defined by the scheduling policy. Stated differently, the thread scheduler 150-2 repeats the reconnaissance phase and calibration phase at a rate determined by the scheduling policy of the operation system. Generally, new threads in the system are assigned CPU quantum according to the scheduling policy. In operation, the reconnaissance phase needs to maintain a sufficient duration in order to capture the characteristic cache access patterns of the workload (e.g., via hardware counters and analytical models).

For example, in one configuration the duration of the reconnaissance phase is 100 million processing instructions. Similarly, during the calibration phase, the thread scheduler 150-2 adjust a thread's CPU quantum every 50 million instructions in accordance with one example embodiment. As such, frequent adjustments allow the cache-fair algorithm to be more responsive. In another example embodiment, to account for program phase changes, the thread scheduler 150-2 repeats the reconnaissance phase at a fixed interval (e.g., predetermined frequency) or, ideally, detects when a thread changes its caching behavior and then repeats the reconnaissance phase upon detecting the change in caching behavior.

Figure 6:
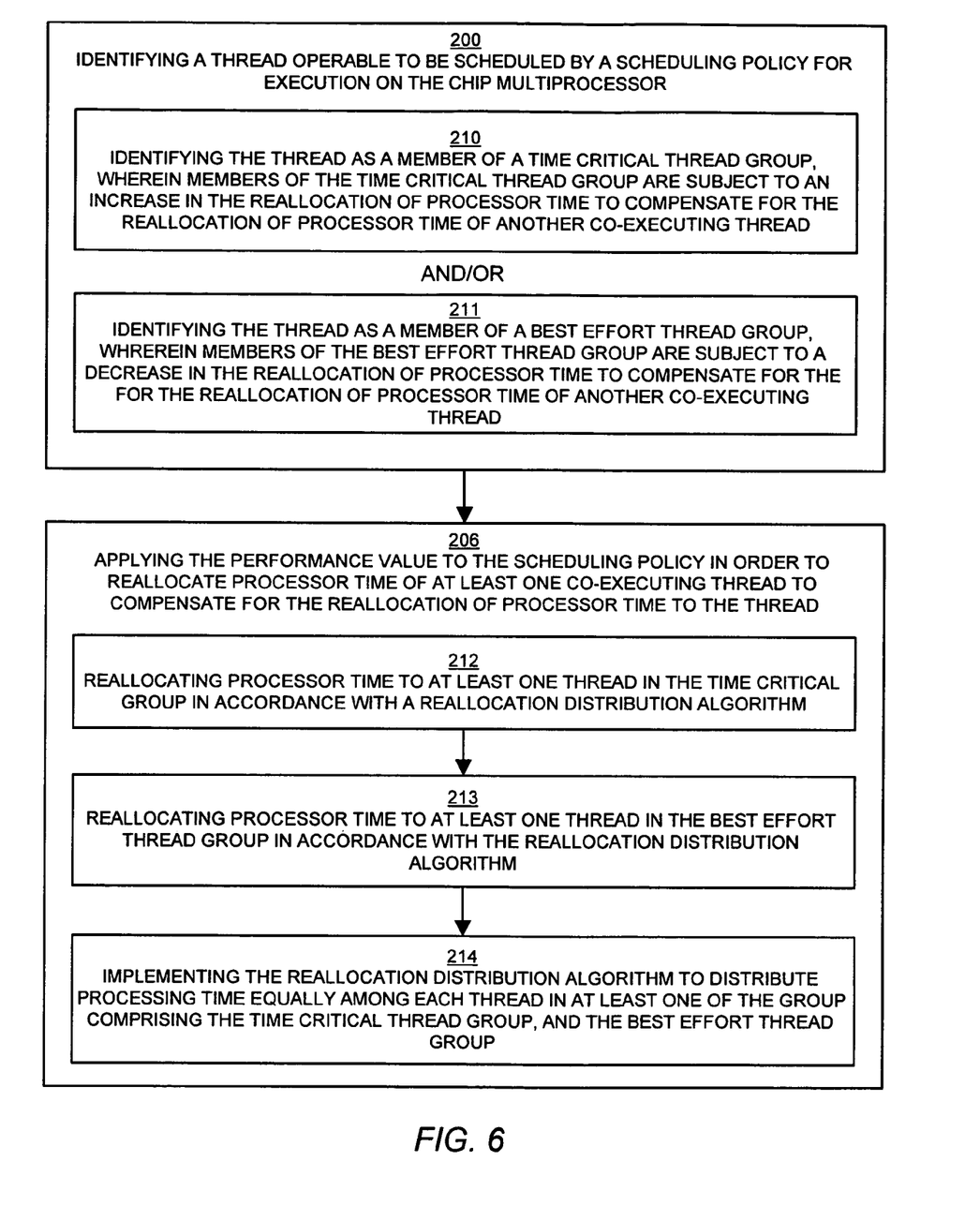
FIG. 6 is a flow chart of processing steps that shows high-level processing operations performed by the thread scheduler when it schedules threads according to a cache-fair policy in accordance with one example embodiment.

FIG. 6 is a flow chart of processing steps that shows high-level processing operations performed by the thread scheduler 150-2 when it schedules cache-fair multiprocessing in accordance with one example embodiment.

In step 210, the thread scheduler 150-2 identifies the thread as a member of a time critical thread group (also referred to as the cache-fair thread group), wherein members of the time critical thread group are subject to an increase in the reallocation of processor time to compensate for the reallocation of processor time of another co-executing thread. In this manner, members of the time critical thread group are not subject to reallocation of processor time to compensate for unequal sharing of the L2 cache with another co-executing thread. Typically, a user specifies a thread's class (e.g., as a member of the time critical group, or best-effort group discussed further below) in the same way the user specifies a thread's scheduling priority. Time critical user jobs that value performance predictability, such as servers and media-streaming systems, will typically reside in the time critical class while less critical jobs will fall into the best-effort class, discussed below. In this respect, the user decides and communicates to the system (e.g., thread scheduler 150-2) the importance of each application allowing the system to appropriately distinguish between critical and non-critical jobs. The system, in turn, ensures that time critical jobs achieve performance similar to what those threads would achieve under fair cache sharing, and less critical jobs are subject only to mild performance penalties.

In step 211, the thread scheduler 150-2 identifies the thread as a member of a best effort thread group, wherein members of the best effort thread group are subject to a decrease in the reallocation of processor time to compensate for the for the reallocation of processor time of another thread (e.g., a thread in the time critical group). In the calibration phase, the thread scheduler 150-2 computes the adjustment to the thread's CPU quantum (e.g., Thread A), and then selects a thread in the best-effort group (e.g., Thread B) for reallocation of the adjusted CPU quantum. The calibration phase is repeated periodically as depicted in the diagram of FIG. 5.

In step 212, the thread scheduler 150-2 reallocates processor time to at least one thread in the time critical group in accordance with a reallocation distribution algorithm (e.g., a cache-fair policy). For example, if during the calibration phase the thread scheduler 150-2 determines that a thread in time critical group needs to be given more CPU time to compensate for unequal cache sharing and that the best-effort group has CPU quantum (e.g., processing core execution time) to spare, the thread scheduler 150-2 will reallocate the extra CPU quantum to a thread in the time critical group.

In step 213, the thread scheduler 150-2 reallocates processor time to at least one thread in the best effort thread group in accordance with the reallocation distribution algorithm. For example, in one embodiment the thread scheduler 150-2 adjusts the CPU quantum of a best-effort thread by the same amount that the thread scheduler 150-2 adjusts the CPU quantum of the time critical thread. If the time critical thread's CPU quantum was increased, the best-effort thread's CPU quantum will be decreased by that same amount. Conversely, if the best-effort thread's CPU quantum is decreased, the time critical thread's CPU quantum will be increased by that same amount. The algorithm chooses the best effort thread so as not to impose a significant reduction of overall CPU time for any best effort thread. The diagram in FIG. 5 shows that the thread scheduler 150-2 adjusts the CPU quantum to a thread in the best-effort group during the calibration phase.

In one example embodiment, the reallocation distribution algorithm selects the thread in the best effort group that experienced the smallest penalty to its CPU quantum up to that point. Conversely, if the thread scheduler 150-2 determines that an increase in processing time for a thread in the best effort group is necessary, the reallocation algorithm selects a thread that has suffered the largest CPU quantum penalty. It should be noted that the adjustment to the best-effort thread's CPU quantum is temporary. For instance, once the thread has executed with the adjusted CPU quantum, the thread's CPU quantum is reset to its original value determined by the scheduling policy.

In step 214, the thread scheduler 150-2 implements the reallocation distribution algorithm to distribute the adjustments (e.g., reallocations) in processing time equally among the threads in the best effort thread group. For example, if during the calibration phase the thread scheduler 150-2 determines that a thread in the time critical group is cache-starved (and is in need of a larger CPU quantum), the redistribution algorithm will borrow CPU quantum equally among the threads in the best effort group.

Figure 7:
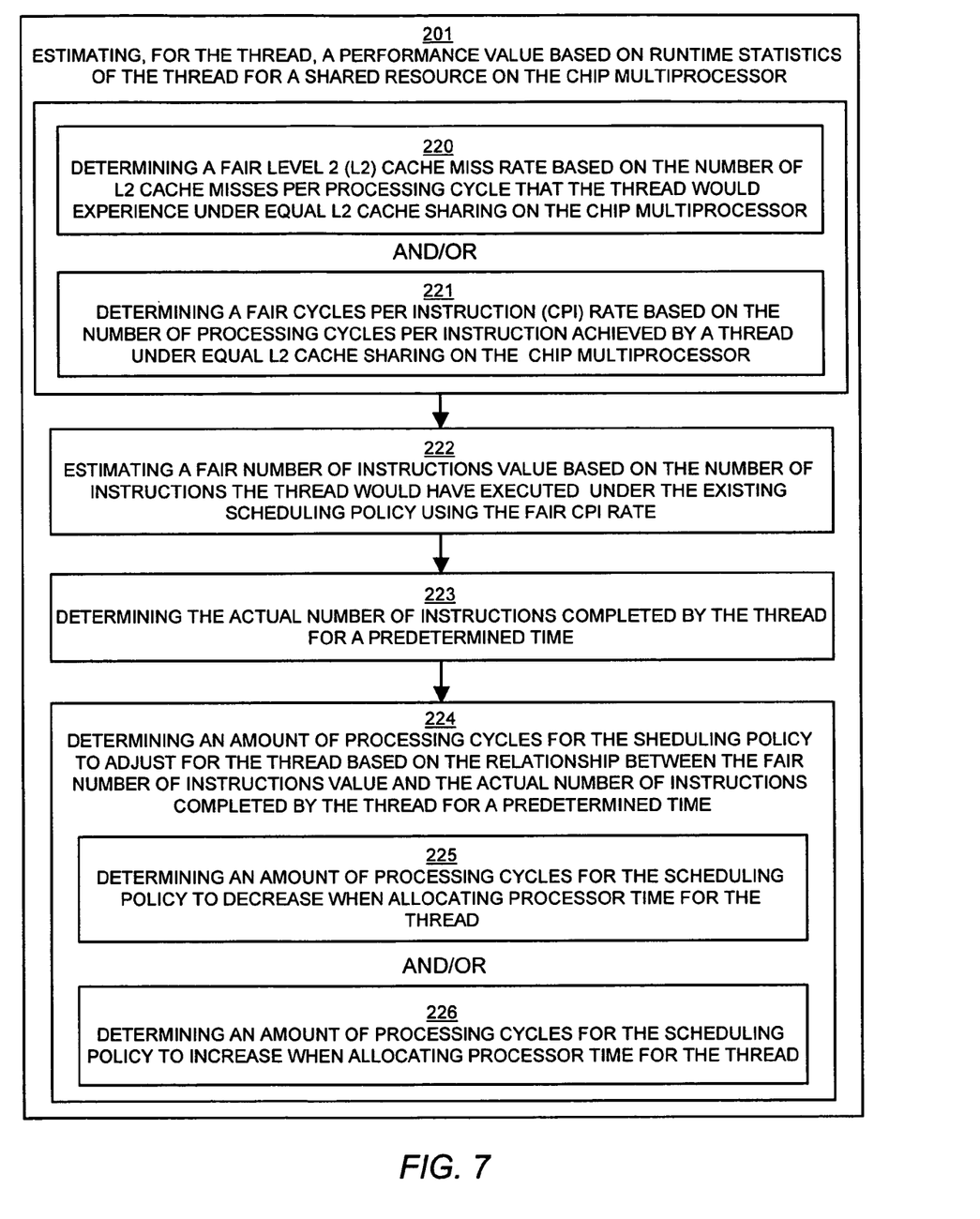
FIG. 7 is a flow chart of processing steps that shows high-level processing operations performed by the thread scheduler when it estimates a performance value for a thread in accordance with one example embodiment.

FIG. 7 is a flow chart of processing steps that shows high-level processing operations performed by the thread scheduler 150-2 when it computes a performance value for a thread in accordance with one example embodiment.

In step 220, the thread scheduler 150-2 determines a fair level 2 (L2) cache miss rate based on the number of L2 cache misses per processing cycle that the thread would experience under equal L2 cache sharing on the chip multiprocessor 113. Determining the fair L2 cache miss rate is generally the first step in computing the performance value for each thread in the system during the reconnaissance phase, as shown in the diagram of FIG. 5. In one embodiment, the performance value is the fair L2 cache miss rate of the identified thread (e.g., Thread A). The methods for determining the fair L2 cache miss rate are augmented by techniques discussed in copending patent application Ser. No. 11/606,736, entitled "METHODS AND APPARATUS FOR ESTIMATING FAIR CACHE MISS RATES ON A CHIP MULTIPROCESSOR", filed concurrently, incorporated herein by reference.

In step 221, the thread scheduler 150-2 determines a fair cycles per instruction (CPI) rate (e.g., the performance value) based on the number of processing cycles per instruction achieved by a thread under equal L2 cache sharing on the chip multiprocessor 113. In one example embodiment, the fair CPI rate (e.g., performance value) is equal to the number of processing cycles per instruction achieved by a thread under equal L2 cache sharing on the chip multiprocessor 113. The thread scheduler 150-2 measures the actual CPI value of a thread using hardware counters 180 and then estimates the fair CPI value of that thread. Additionally, the thread scheduler 150-2 compares a thread's fair CPI with its actual CPI and then estimates the temporary adjustment to the thread's CPU quantum. As a consequence, by the end of the thread's next CPU quantum, the thread will complete the number of instructions corresponding to its fair CPI value. If the thread has been running faster than it would at its fair CPI value, the thread scheduler 150-2 decreases the thread's CPU quantum. Conversely, if the thread has been running slower than it would at its fair CPI value, the thread scheduler 150-2 will increase the thread's CPU quantum.

In step 222, the thread scheduler 150-2 estimates a fair number of instructions value based on the number of instructions the thread would have executed under the existing scheduling policy using the fair CPI rate. In one example embodiment, the performance value of a thread is based on the fair number of instructions value, the fair CPI rate, and/or the fair L2 cache rate of the thread.

In step 223, the thread scheduler 150-2 determines the actual number of instructions completed by the thread for a predetermined time. In one example embodiment, the thread scheduler 150-2 also determines the actual L2 cache miss rate, the actual store buffer delay and/or memory bus delay for a predetermined time. Based on these values, the thread scheduler 150-2 computes the performance value if the thread experienced no L2 cache misses (e.g., the thread had a perfect-cache performance value). According to an example configuration, the estimation of the performance value (e.g., fair performance value) of a thread is based on the perfect-cache performance value computed by the thread scheduler 150-2 during the calibration phase, and the fair L2 cache rate of the thread, the fair store-buffer delay of the thread and the fair memory-bus delay of thread computed during the reconnaissance phase.

In step 224, the thread scheduler 150-2 determines an amount of processing cycles for the scheduling policy to adjust for the thread based on the relationship between the fair performance value and the actual performance value. For example, in one embodiment the performance value of a thread is the amount of processing cycles (e.g., CPU quantum) for the scheduling policy (via the thread scheduler 150-2) to adjust for the thread.

In step 225, the thread scheduler 150-2 determines an amount of processing cycles for the scheduling policy to decrease when allocating processor time for the thread. Consequently, the scheduling policy (via thread scheduler 150-2) must increase CPU quantum (e.g., processing cycles) of at least one other co-running thread (e.g., best-effort thread) to compensate for the decreased allocation of processing time to the thread (e.g., time critical thread).

In step 226, the thread scheduler 150-2 determines an amount of processing cycles for the scheduling policy to increase when allocating processor time for the thread. As a result, the scheduling policy (via thread scheduler 150-2) must decrease CPU quantum (e.g., processing cycles) of at least one other co-running thread (e.g., best-effort thread) to compensate for the increased allocation of processing time to the thread (e.g., time critical thread.

Those skilled in the art should readily appreciate that the programs and methods for scheduling applications on a chip multiprocessor as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for scheduling applications on a chip multiprocessor audio information has been particularly shown and described with references to embodiments thereof, it will be understood by those skilled in the art that various changes in form and details may be made therein without departing from the scope of the invention encompassed by the appended claims.

What I claim is:

1. A method for scheduling applications on a chip multiprocessor comprising:
   identifying a thread operable to be scheduled by a scheduling policy for execution on the chip multiprocessor;
   estimating, for the thread, a performance value based on runtime statistics of the thread for a shared resource on the chip multiprocessor;
   applying the performance value to the scheduling policy in order to reallocate processor time of the thread commensurate with the performance value under fair distribution of the shared resource on the chip multiprocessor; and
   applying the performance value to the scheduling policy in order to reallocate processor time of at least one co-executing thread to compensate for the reallocation of processor time to the thread;
   wherein the estimating, for the thread, a performance value based on runtime statistics of the thread for a shared resource on the chip multiprocessor comprises at least one of:
   determining a fair level 2 (L2) cache miss rate based on the number of L2 cache misses per processing cycle that the thread would experience under equal L2 cache sharing on the chip multiprocessor; and
   determining a fair cycles per instruction (CPI) rate based on the number of processing cycles per instruction achieved by a thread under equal L2 cache sharing on the chip multiprocessor;
   and wherein the estimating, for the thread, a performance value based on runtime statistics of the thread for a shared resource on the chip multiprocessor comprises:
   estimating a fair number of instructions value based on the number of instructions the thread would have executed under the existing scheduling policy using the fair CPI rate; and
   determining the actual number of instructions completed by the thread for a predetermined time.

2. The method of claim 1 further comprising:
   at a predetermined frequency defined by the scheduling policy, repeating the steps of:
   applying the performance value to the scheduling policy in order to reallocate processor time of the thread commensurate with the performance value under fair distribution of the shared resource on the chip multiprocessor; and
   applying the performance value to the scheduling policy in order to reallocate processor time of at least one co-executing thread to compensate for the reallocation of processor time to the thread.

3. The method of claim 1 wherein the identifying a thread operable to be scheduled for execution on the chip multiprocessor comprises at least one of:
   identifying the thread as a member of a time critical thread group, wherein members of the time critical thread group are subject to an increase in the reallocation of processor time to compensate for the reallocation of processor time of another co-executing thread; and
   identifying the thread as a member of a best effort thread group, wherein members of the best effort thread group are subject to a decrease in the reallocation of processor time to compensate for the reallocation of processor time of another co-executing thread.

4. The method of claim 3 wherein the applying the performance value to the scheduling policy in order to reallocate processor time of at least one other co-executing thread to compensate for the reallocation of processor time to the thread comprises at least one of:
  reallocating processor time to at least one thread in the time critical group in accordance with a reallocation distribution algorithm; and
  reallocating processor time to at least one thread in the best effort thread group in accordance with the reallocation distribution algorithm.

5. The method of claim 4 further comprising:
  implementing the reallocation distribution algorithm to distribute processing time equally among each thread in at least one of the group comprising the time critical thread group, and the best effort thread group.

6. The method of claim 1 wherein the estimating, for the thread, a performance value based on runtime statistics of the thread for a shared resource on the chip multiprocessor comprises:
  determining an amount of processing cycles for the scheduling policy to adjust for the thread based on the relationship between the fair number of instructions value and the actual number of instructions completed by the thread for a predetermined time.

7. The method of claim 6 wherein the determining an amount of processing cycles for the scheduling policy to adjust for the thread comprises at least one of:
  determining an amount of processing cycles for the scheduling policy to decrease when allocating processor time for the thread; and
  determining an amount of processing cycles for the scheduling policy to increase when allocating processor time for the thread.

8. The method of claim 1 wherein estimating, for the thread, a performance value based on runtime statistics of the thread for a shared resource on the chip multiprocessor comprises at least one of:
  estimating, for the thread, the performance value based on runtime statistics of the thread for a level 2 (L2) cache on the chip multiprocessor;
  estimating, for the thread, a performance value based on runtime statistics of the thread for a memory bus on the chip multiprocessor; and
  estimating, for the thread, a performance value based on runtime statistics of the thread for a store buffer on the chip multiprocessor.

9. A computerized device comprising:
  a memory;
  a chip multiprocessor;
  a communications interface;
  an interconnection mechanism coupling the memory, the chip multiprocessor and the communications interface; and
  wherein the memory is encoded with thread scheduling application that when executed on the chip multiprocessor provides a thread scheduling process causing the computerized device to perform the operations of:
  identifying a thread operable to be scheduled by a scheduling policy for execution on the chip multiprocessor;
  estimating, for the thread, a performance value based on runtime statistics of the thread for a shared resource on the chip multiprocessor;
  applying the performance value to the scheduling policy in order to reallocate processor time of the thread commensurate with the performance value under fair distribution of the shared resource on the chip multiprocessor; and
  applying the performance value to the scheduling policy in order to reallocate processor time of at least one co-executing thread to compensate for the reallocation of processor time to the thread;
  wherein the estimating, for the thread, a performance value based on runtime statistics of the thread for a shared resource on the chip multiprocessor comprises at least one of:
  determining a fair level 2 (L2) cache miss rate based on the number of L2 cache misses per processing cycle that the thread would experience under equal L2 cache sharing on the chip multiprocessor; and
  determining a fair cycles per instruction (CPI) rate based on the number of processing cycles per instruction achieved by a thread under equal L2 cache sharing on the chip multiprocessor;
  and wherein the estimating, for the thread, a performance value based on runtime statistics of the thread for a shared resource on the chip multiprocessor comprises:
  estimating a fair number of instructions value based on the number of instructions the thread would have executed under the existing scheduling policy using the fair CIP rate; and
  determining the actual number of instructions completed by the thread for a predetermined time.

10. The computerized device of claim 9 further comprising:
  at a predetermined frequency defined by the scheduling policy, repeating the steps of:
  applying the performance value to the scheduling policy in order to reallocate processor time of the thread commensurate with the performance value under fair distribution of the shared resource on the chip multiprocessor; and
  applying the performance value to the scheduling policy in order to reallocate processor time of at least one co-executing thread to compensate for the reallocation of processor time to the thread.

11. The computerized device of claim 9 wherein the identifying a thread operable to be scheduled for execution on the chip multiprocessor comprises at least one:
  identifying the thread as a member of time critical thread group, wherein members of the time critical thread group are subject to an increase in the reallocation of processor time to compensate for the reallocation of processor time of another co-existing thread; and
  identifying the thread as a member of a best effort thread group, wherein members of the best effort thread group are subject to a decrease in the reallocation of processor time to compensate for the reallocation of processor time of another co-executing thread.

12. The computerized device of claim 11 wherein the applying the performance value to the scheduling policy in order to reallocate processor time of at least one other co-executing thread to compensate for the reallocation of processor time to the thread comprises at least one:
  reallocating processor time to at least one thread in the time critical group in accordance with a reallocation distribution algorithm; and
  reallocating processor time to at least one thread in the best effort thread group in accordance with the reallocation distribution algorithm.

13. The computerized device of claim 12 further comprising:
  implementing the reallocation distribution algorithm to distribute processing time equally among each thread in at least one of the group comprising the time critical thread group, and the best effort thread group.

14. The computerized device of claim 9 wherein the estimating, for the thread, a performance value based on runtime statistics of the thread for a shared resource on the chip multiprocessor comprises:
   determining an amount of processing cycles for the scheduling policy to adjust for the thread based on the relationship between the fair L2 cache miss rate, the fair CPI rate, the fair number of instructions value and the actual number of instructions completed by the thread for a predetermined time; and
   wherein determining an amount of processing cycles for the scheduling policy to adjust for the thread comprises:
   determining an amount of processing cycles for the scheduling policy to decrease when allocating processor time for the thread; and
   determining an amount of processing cycles for the scheduling policy to increase when allocating processor time for the thread.

15. A non-transitory computer readable medium having computer program logic embodied in computer program code encoded thereon as an encoded set of chip multiprocessor based instructions for performing thread scheduling comprising:
   computer program code for identifying a thread operable to be scheduled by a scheduling policy for execution on the chip multiprocessor;
   computer program code for estimating, for the thread, a performance value based on runtime statistics of the thread for a shared resource on the chip multiprocessor;
   computer program code for applying the performance value to be scheduling policy in order to reallocate processor time of the thread commensurate with the performance value under fair distribution of the shared resource on the chip multiprocessor; and
   computer program code for applying the performance value to the scheduling policy in order to reallocate processor time of at least one co-executing thread to compensate for the reallocation of processor time to the thread;
   wherein the computer program code for estimating, for the thread, a performance value based on runtime statistics of the thread for a shared resource on the chip multiprocessor comprises at least one of:
   computer program code for determining a fair level 2 (L2) cache miss rate based on the number of L2 cache misses per processing cycle that the thread would experience under equal L2 cache sharing on the chip multiprocessor; and
   computer program code for determining a fair cycles per instruction (CPI) rate based on the number of processing cycles per instruction achieved by a thread under equal L2 cache sharing on the chip multiprocessor;
   and wherein the computer program code for estimating, for the thread, a performance value based on runtime statistics of the thread for a shared resource on the chip multiprocessor comprises:
   computer program code for estimating a fair number of instructions value based on the number of instructions the thread would have executed under the existing scheduling policy using the fair CIP rate; and
   computer program code for determining the actual number of instructions completed by the thread for a predetermined time.

16. A computerized device comprising:
   a memory;
   a chip multiprocessor;
   a communications interface;
   an introduction mechanism coupling the memory, the chip multiprocessor and the communications interface; and
   wherein the memory is encoded with thread scheduling application that when executed on the chip multiprocessor provides a means for scheduling applications on the chip multiprocessor comprising:
   means for identifying a thread operable to be scheduled by a scheduling policy for execution on the chip multiprocessor;
   means for estimating, for the thread, a performance value based on runtime statistics of the thread for a shared resource on the chip multiprocessor;
   means for applying the performance value to the scheduling policy in order to reallocate processor time of the thread commensurate with the performance value under fair distribution of the shared resource on the chip multiprocessor; and
   means for applying the performance value to the scheduling policy in order to reallocate processor time of at least one co-executing thread to compensate for the reallocation of processor time to the thread;
   wherein the estimating, for the thread, a performance value based on runtime statistics of the thread for a shared resource on the chip multiprocessor comprises at least one of:
   determining a fair level 2 (L2) cache miss rate based on the number of L2 cache misses per processing cycle that the thread would experience under equal L2 cache sharing on the chip multiprocessor; and
   determining a fair cycles per instruction (CPI) rate based on the number of processing cycles per instruction achieved by a thread under equal L2 cache sharing on the chip multiprocessor;
   and wherein the estimating, for the thread, a performance value based on runtime statistics of the thread for a shared resource on the chip multiprocessor comprises:
   estimating a fair number of instructions value based on the number of instructions the thread would have executed under the existing scheduling policy using the fair CIP rate; and
   determining the actual number of instructions completed by the thread for a predetermined time.

* * * * *